United States Patent
Floessholzer et al.

(10) Patent No.: US 12,279,712 B2
(45) Date of Patent: Apr. 22, 2025

(54) STEAM COOKING APPARATUS AND METHOD

(71) Applicant: KONINKLIJKE PHILIPS N.V., Eindhoven (NL)

(72) Inventors: Hannes Floessholzer, St. Paul (AT); Jan Vaupot, Slovenj Gradec (SI); Florian Krall, Klgenfurt (AT)

(73) Assignee: KONINKLIJKE PHILIPS N.V., Eindhoven (NL)

(*) Notice: Subject to any disclaimer, the term of this patent is extended or adjusted under 35 U.S.C. 154(b) by 246 days.

(21) Appl. No.: 17/267,062

(22) PCT Filed: Nov. 4, 2019

(86) PCT No.: PCT/EP2019/080029
§ 371 (c)(1),
(2) Date: Feb. 9, 2021

(87) PCT Pub. No.: WO2020/099158
PCT Pub. Date: May 22, 2020

(65) Prior Publication Data
US 2022/0346586 A1 Nov. 3, 2022

(30) Foreign Application Priority Data

Nov. 15, 2018 (EP) .................................. 18206540
Jan. 10, 2019 (EP) .................................. 19151085

(51) Int. Cl.
*A47J 27/04* (2006.01)
*A23L 5/10* (2016.01)
(Continued)

(52) U.S. Cl.
CPC ............... *A47J 27/04* (2013.01); *A23L 5/13* (2016.08); *A47J 27/004* (2013.01); *F22D 5/26* (2013.01);
(Continued)

(58) Field of Classification Search
CPC .......... A47J 27/04; A47J 27/004; A47J 36/32; A47J 2027/043; A23L 5/13; A23V 2002/00
See application file for complete search history.

(56) References Cited

U.S. PATENT DOCUMENTS 4,162,381 A * 7/1979 Buck .................... H05B 6/6458
426/243
4,876,426 A    10/1989 Smith
(Continued)

FOREIGN PATENT DOCUMENTS

CN          1496665 A        5/2004
CN          102389258        3/2012
(Continued)

OTHER PUBLICATIONS

International Search Report and Written Opinion dated Feb. 4, 2020 for International Application No. PCT/EP2019/080029 filed Nov. 4, 2019.
(Continued)

*Primary Examiner* — Steven N Leff
(74) *Attorney, Agent, or Firm* — Maschoff Brennan

(57) ABSTRACT

Provided is a cooking apparatus (10). The cooking apparatus comprises a food chamber (12), and a steam supply (16, 20, 23) for supplying steam to the food chamber. A control arrangement (22, 28) controls the steam supply to maintain a steam concentration in air inside the food chamber which is below saturation. Further provided is a method of cooking.

13 Claims, 2 Drawing Sheets

(51) Int. Cl.
    *A47J 27/00*     (2006.01)
    *F22D 5/26*     (2006.01)
    *F24C 15/32*     (2006.01)
    *A47J 36/32*     (2006.01)

(52) U.S. Cl.
    CPC .......... *F24C 15/32* (2013.01); *A23V 2002/00* (2013.01); *A47J 2027/043* (2013.01); *A47J 36/32* (2013.01)

(56) References Cited

U.S. PATENT DOCUMENTS

| | | | | |
|---|---|---|---|---|
| 4,924,072 | A * | 5/1990 | Oslin | F24C 15/325 219/400 |
| 5,365,039 | A * | 11/1994 | Chaudoir | A21B 3/04 99/468 |
| 5,619,983 | A | 4/1997 | Smith | |
| 5,680,810 | A * | 10/1997 | Sham | A47J 27/16 126/369 |
| 6,101,925 | A * | 8/2000 | Hsu | A47J 27/04 99/476 |
| 6,310,325 | B1 | 10/2001 | Colburn | |
| 9,770,127 | B2 * | 9/2017 | Bilet | F24C 7/085 |
| 2004/0131738 | A1 * | 7/2004 | Holm | A23L 5/40 426/511 |
| 2009/0007798 | A1 * | 1/2009 | Yamaguchi | F24C 15/327 219/401 |
| 2010/0000418 | A1 | 1/2010 | Payen et al. | |
| 2010/0000419 | A1 | 1/2010 | Payen et al. | |
| 2012/0043318 | A1 * | 2/2012 | Komuro | F24C 15/327 219/757 |
| 2018/0035698 | A1 | 2/2018 | McNerney | |
| 2018/0132648 | A1 | 5/2018 | Furlanetto | |
| 2018/0289212 | A1 | 10/2018 | Sladecek | |
| 2018/0299138 | A1 * | 10/2018 | Faraldi | F24C 15/2007 |

FOREIGN PATENT DOCUMENTS

| | | | | |
|---|---|---|---|---|
| CN | 202874949 U | 4/2013 | | |
| CN | 206995160 U | 2/2018 | | |
| DE | 102015115867 A1 | 3/2017 | | |
| EP | 2860457 A1 | 4/2015 | | |
| JP | 2000333830 A | 12/2000 | | |
| JP | 2005065819 | 3/2005 | | |
| JP | 2006038254 A | 2/2006 | | |
| JP | 2017-020780 A | 1/2017 | | |
| KR | 20050058065 A | 6/2005 | | |
| WO | WO-2017072068 A1 * | 5/2017 | .......... | A47J 37/0641 |

OTHER PUBLICATIONS

Written Opinion of The International Preliminary Examining Authority dated Sep. 21, 2020 for International Application No. PCT/EP2019/080029 filed Nov. 4, 2019.

International Preliminary Report on Patentability dated Dec. 23, 2020 for International Application No. PCT/EP2019/080029 filed Nov. 4, 2019.

* cited by examiner

STEAM COOKING APPARATUS AND METHOD

CROSS REFERENCE TO RELATED APPLICATIONS

This application is the U.S. National Phase application under 35 U.S.C. § 371 of International Application No. PCT/EP2019/080029 filed Nov. 4, 2019, which claims the benefit of European Patent Application Number 18206540.9 filed Nov. 15, 2018 and European Patent Application Number 19151085.8 filed Jan. 10, 2019. These applications are hereby incorporated by reference herein.

FIELD OF THE INVENTION

This invention relates to a steam cooker (also referred to as a steamer) and steam cooking method.

BACKGROUND OF THE INVENTION

Steam cooking (also referred to as steaming) is commonly known as one of the healthiest cooking methods. In particular, steam cooking is often preferred over other cooking methods such as boiling, frying and baking because it results in a lower amount of nutrient destruction. This is because steam cooking operates at a lower temperature, below 100° C., but nevertheless enables short cooking times due to the wet steam environment. The presence of water as the cooking medium causes a leaching out of water soluble nutrients when boiling, and this is greatly reduced by steam cooking.

However, steam cooking has some disadvantages. Steamers currently on the market generate a saturated steam environment in the food chamber. The overproduction of steam required to generate such an environment causes condensation in the food chamber, and steam escaping to the surroundings, e.g. onto kitchen furniture, which is unwanted. Moreover, overproducing steam in this manner means a relatively high consumption of energy and water.

Condensation may result in steamed up viewing windows making it difficult to inspect the cooking process, possible soggy food consistency, and a dripping wet food chamber after cooking. The soggy consistency results because wet steam condenses and deposits as water droplets on the food surface, whereupon the food absorbs the water. As a result, there can be a gain of food weight of up to 10% and a deterioration of taste quality. Moreover, steam overproduction may mean that control over the doneness level of food may be compromised. The food risks becoming overcooked in the saturated steam environment provided in such conventional steamers, in spite of using the recommended settings and following the recommended cooking timetables.

There is a need for a steam cooking process which maintains the nutritional advantages but avoids one or more of these problems.

US 2018/289212 A1 discloses an apparatus and method for preparing food ingredients with hot air and fluid introduced thereinto.

U.S. Pat. No. 4,876,426 A discloses a method and apparatus for water vapor control in convection ovens.

SUMMARY OF THE INVENTION

The invention is defined by the claims.

According to an aspect there is provided a cooking apparatus comprising: a food chamber; a steam supply for supplying steam to the food chamber; a transparent viewing window into the food chamber; and a control arrangement adapted to control the steam supply to maintain a steam concentration in air inside the food chamber which is below saturation.

The steam concentration in air inside the food chamber is thus maintained below 100% relative humidity (RH) throughout the cooking process, e.g. less than ~580 g/m$^3$ absolute humidity (AH) at 100° C. The steam concentration in air required for saturation varies according to the conditions inside the food chamber, in particular the temperature and the pressure. In order to maintain the below-saturation steam concentration, the control arrangement may be suitably configured take into account of such changes, e.g. increases, in the temperature and the pressure during cooking.

There may be several advantages to ensuring that the steam concentration in air inside the food chamber is maintained below saturation during the cooking process. In particular, this measure may lessen or avoid the issue of water condensation. The result is that the apparatus according to the present invention alleviates or removes the problems of soggy food consistency, and a dripping wet food chamber after cooking.

Moreover, lessening or avoiding water condensation may mean that visual inspection of the food being cooked inside the food chamber, e.g. via the suitable transparent viewing window, may be facilitated because the problem of fogging by condensation is alleviated or removed.

The inventors have furthermore realised that the humidity conditions inside the food chamber may, providing that the air is not saturated with steam, provide a useful indicator of the doneness level of the food being cooked therein. This indicator is particularly useful because it does not require, for instance, measuring the core temperature of the food using a temperature sensor extending into the foodstuff being cooked.

At the initial stages of the cooking process, water may condense on the food received in the food chamber. The temperature of the food increases as the cooking process progresses which causes the degree of condensation on the food to decrease. This may be to the extent that water no longer condenses on the food. Providing the steam concentration in air inside the food chamber is maintained below saturation, the diminishing degree of condensation on the food as the cooking process proceeds may coincide with an increasing steam concentration in air inside the food chamber. Thus, by monitoring the humidity/steam concentration inside the food chamber, the temperature, and thus the doneness, of the food contained therein may be estimated.

The steam supply may comprise: a heated surface for evaporating water; and a water supply arranged to dispense water onto the heated surface, wherein the control arrangement is adapted to control the water supply. Such a steam supply may provide a facile means of controlling the steam concentration within the food chamber, i.e. by controlling the dispensing of water on the heated surface.

In a particularly preferred embodiment, the steam supply may evaporate water at a rate of 10-16 g/min. In such an embodiment, the food mass may be, for example, 0.1-1 kg.

The control arrangement may be adapted to control the water supply to dispense water at a predetermined rate. This may be achieved, for instance, by employing a suitable dosing system.

The water supply may comprise: a reservoir for the water; and a pump for transporting the water from the reservoir to the heated surface. The pump may be controlled by the control arrangement. The control arrangement may, for example, comprise a suitable controller, e.g. a microcontroller, for controlling the pump according to the steam concentration inside the food chamber.

The cooking apparatus may comprise a heater arranged to heat the food chamber. The heater may deliver heat to compensate for heat losses during cooking.

The control arrangement may be further adapted to control the heater to heat the food chamber to a predetermined temperature. Thus, the control arrangement may control both the temperature and the steam supply, such as to facilitate control over the steam concentration. Additionally controlling the temperature inside the food chamber may facilitate maintaining of the steam concentration below saturation.

The heater may be adapted to heat the food chamber to at least 100° C. In a particularly preferred embodiment, the food chamber is heated in the range of 100° C. to 120° C. Cyclic control of the heating arrangement may, for example, be used to maintain the temperature in the desired range. Above 100° C., the surfaces of the food chamber may be maintained above the dew point at the operating temperature, pressure and humidity level, so that condensation at a surface of the food chamber, such as the viewing window, may be minimised or prevented.

The cooking apparatus may comprise a fan arranged to circulate the gases in the food chamber. In a particularly preferred embodiment, gases are circulated at a minimum rate of about 2 l/min. The heater may be along the circulation path so as to further heat the steam to create a high temperature dry steam environment. The circulation system thus moves the steam and air inside the chamber to the food to increase convection. This also assists in producing a homogeneous temperature field of all parts inside the food chamber, including the viewing window, thereby to minimise or avoid condensation.

A side effect of the circulation of saturated air at an elevated temperature (such as 120° C.) compared to wet steam at around 100° C. is that the heat transfer rate to food due to condensation and convection is increased. As a result, the time to cook the food is decreased compared to standard steam cooking. Accordingly, the circulation combined with the 100° C. to 120° C. temperature inside the food chamber may permit cooking times for below-saturation steam concentration conditions to be comparable to the steam saturation conditions in conventional steamers.

The cooking apparatus may comprise a moisture sensor for detecting the steam concentration in the food chamber. The moisture sensor may, for example, include a humidity sensor. Detecting the steam concentration or humidity during cooking under below-saturation conditions may enable the doneness level of the food being cooked to be estimated, as previously described.

The control arrangement may be adapted to control the steam supply according to the steam concentration detected by the moisture sensor. The control arrangement may be adapted, for example, to cease or restrict supply of the steam when the steam concentration reaches a threshold concentration. The threshold concentration may, for instance, be set at 90% RH or 500 g/m$^3$ AH at 120° C.

As an alternative or in addition to controlling the steam supply or heater in response to the threshold concentration being reached, an audible and/or visual alarm may be included in the apparatus to alert the user to the fact that the threshold concentration has been reached. The user may then stop the cooking process or remove the food from the food chamber.

The steam concentration inside the chamber may be used to monitor doneness while the control arrangement may, for example, control the steam supply to supply steam at a predetermined rate. This means that doneness monitoring and steam concentration control may be implemented independently of each other, i.e. without the steam concentration being adjusted, reduced or stopped in response to the monitored doneness. The need for the control arrangement to include a controller, e.g. a microcontroller, may be correspondingly obviated.

The threshold concentration may, for example, be set according to the estimated or predicted doneness level of the food. Alternatively or additionally, the threshold concentration may be set according to the type of food being cooked and/or the desired result, e.g. al dente/crunchy, medium, soft, etc.

The control arrangement may be adapted to control the heater, when the heater is included in the apparatus, according to the steam concentration detected by the moisture sensor. The control arrangement may be adapted, for example, to control the heater to reduce or stop heating of the food chamber when the aforementioned threshold concentration is reached.

The food chamber may comprise a vent for steam to escape from the food chamber. The vents of the food chamber may maintain the pressure at ambient pressure. The release mechanism provided by the vents means that a preset water delivery rate to the heated surface may, for example, be employed to control the steam concentration.

In a particularly preferred embodiment, the vent may be defined by an opening having a diameter of 2 mm to 5 mm. It has been found that an opening having such dimensions may assist with maintaining of the desired steam concentration and temperature inside the food chamber.

The cooking apparatus comprises a transparent viewing window into the food chamber. The relatively dry environment inside the food chamber, e.g. relative to the conditions inside conventional steamers, may mean that condensation is reduced or prevented so that inspection of the food can take place during cooking. The viewing window may, for instance, be included in an openable lid of the food chamber.

According to a further aspect there is provided a method of cooking comprising: receiving food to be cooked in a food chamber with a transparent viewing window; supplying steam to the food chamber; and controlling the supply of steam such that a steam concentration in air inside the food chamber is maintained below saturation.

The steam supply may comprise a heated surface for evaporating water, and a water supply arranged to dispense water onto the heated surface, wherein the controlling comprises controlling the dispensing of the water onto the heated surface.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
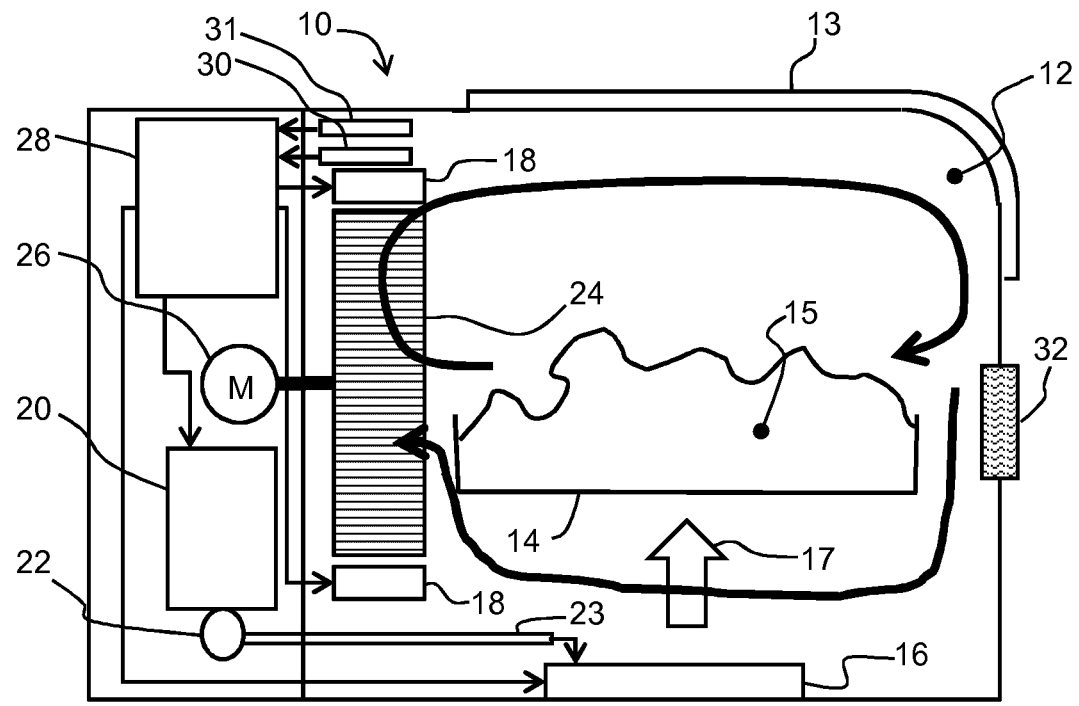
FIG. 1 shows a cooking apparatus.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Provided is a cooking apparatus. The cooking apparatus comprises a food chamber, and a steam supply for supplying steam to the food chamber. A control arrangement controls the steam supply to maintain a steam concentration in air inside the food chamber which is below saturation.

The steam concentration in air inside the food chamber is thus maintained below 100% relative humidity (RH) throughout the cooking process, e.g. less than ~580 g/m$^3$ absolute humidity (AH) at 100° C. The steam concentration in air required for saturation varies according to the conditions inside the food chamber, in particular the temperature and the pressure. In order to maintain the below-saturation steam concentration in air inside the food chamber, the control arrangement may take into account changes in the temperature and the pressure. This may be achieved by, for instance, the control arrangement restricting the supply of steam delivered by the steam supply to the extent that the steam concentration does not approach saturation at the temperature and pressure conditions inside the food chamber envisaged for cooking. This may involve, for example, utilising a continuous but suitably restricted supply of steam, or an intermittent supply of steam, e.g. delivered at various stages or temperatures during the cooking process. Such stages or temperatures may be predetermined. A predicted steam concentration, temperature and/or pressure may be used to avoid oversupplying steam, i.e. thereby to avoid reaching saturation. Controlling the steam supply according to predetermined settings may mean, for example, that the apparatus need not include a sensor, such as a moisture sensor.

In alternative examples, the control arrangement may be responsive to changes in at least one of the steam concentration, temperature and pressure, such as to restrict the supply of steam delivered by the steam supply when the conditions are such that saturation (100% RH) is approaching. In this respect, the apparatus may, for instance, include a moisture sensor and optionally a temperature sensor. Such a sensor or sensors may be utilised by the control arrangement to provide feedback control over the steam supply.

There may be several advantages to ensuring that the steam concentration in air inside the food chamber is maintained below saturation, i.e. throughout the cooking process. In particular, this measure may lessen or avoid the issue of water condensation encountered with conventional steam cookers which utilise an overproduction of steam in order to attain steam saturation during cooking. The result is that the apparatus according to the present invention diminishes or removes the problems of soggy food consistency, and a dripping wet food chamber after cooking. The former may avoid undesirable gain of food weight of up to 10% and a deterioration of taste quality, which otherwise occur when a steam overproduction is used. Cooking using the apparatus according to present embodiments may also consume less energy and water.

The inventors have surprisingly found that a below-saturation steam concentration may not entail any significant increase in cooking time, which will be explained further in the context of FIG. 3.

Moreover, lessening or avoiding the issue of water condensation may mean that visual inspection of the food being cooked inside the food chamber, e.g. via a suitable transparent viewing window, may be facilitated because the problem of fogging by condensation is alleviated or removed.

The inventors have furthermore realised that the humidity conditions inside the food chamber may, providing that the air is not saturated with steam, provide a useful indicator of the doneness level of the food being cooked therein. This indicator is particularly useful because it does not require, for instance, measuring the core temperature of the food using a temperature sensor extending into the foodstuff being cooked.

At the initial stages of the cooking process, water may condense on the food received in the food chamber. The temperature of the food increases as the cooking process progresses which causes the degree of condensation on the food to decrease. This may be to the extent that water no longer condenses on the food. Providing the steam concentration in air inside the food chamber is maintained below saturation, the diminishing degree of condensation on the food as the cooking process proceeds may coincide with an increasing steam concentration in air inside the food chamber. Thus, by monitoring the humidity/steam concentration inside the food chamber, the temperature of the food contained therein may be estimated. In other words, the humidity inside the food chamber may be used as a proxy for the temperature of the food, and thus the level of doneness of the food during the cooking process.

The control arrangement may cease or restrict supply of the steam when the steam concentration reaches a threshold concentration, e.g. which is indicative of the level of doneness of the food. In this way, the apparatus may avoid food becoming overcooked. The threshold concentration may, for instance, be set at 90% RH or 500 g/m$^3$ AH at 100° C. When the apparatus further includes a heater for heating the food chamber, the control arrangement may be adapted to control the heater to reduce or stop heating of the food chamber when the threshold concentration is reached, thereby to further mitigate the risk of the food becoming overcooked. An audible and/or visual alarm may be included in the apparatus to signal when the threshold concentration has been reached.

FIG. 1 shows a cooking apparatus 10, comprising a food chamber 12 in which a food basket 14 is mounted. The food chamber has a viewing window 13 which may also be the openable lid of the apparatus. Food 15 to be cooked is placed on the food basket which then places the food near the center of the food chamber. The food basket has air permeable side walls and optionally an air permeable base so that air and steam can circulate through the basket to the food.

There is a heating arrangement which in this example comprises a heated surface 16 and a heater 18. The heated surface is used to generate steam (shown as arrow 17) from water which is delivered from a water reservoir 20 by a dosing system 22. The dosing system provides water to a feed arrangement 23 which delivers water to the heated surface to generate steam. The water reservoir 20 and the feed arrangement 23 may be regarded as components of a water supply 20, 23. The water supply 20, 23, together with the heated surface 16, constitute the steam supply 16, 20, 23 of the apparatus shown in FIG. 1. The dosing system 22 may be included in the control arrangement 22, 28 which controls the steam supply 16, 20, 23 to maintain a steam concentration in air inside the food chamber which is below saturation, as previously described.

The dosing system may deliver a constant flow of water during cooking or a regularly pulsed delivery of water (so needing no feedback control), but it could also be controlled responsively during cooking using feedback from a moisture sensor 31. A pump may, for example, be used to control the dispensing of water onto the heated surface. The moisture sensor 31 may, for example, comprise at least one of a humidity sensor, a water switch, a rain sensor and a camera.

A circulation system is provided in the form of a fan 24 and motor 26. The circulation system circulates the steam generated by the heated surface 16 around the food chamber. The heater 18 is along the circulation path and thereby further heats the steam to create a high temperature dry steam environment. The circulation system thus moves the steam and air inside the chamber to the food to increase convection and also assists in producing a homogeneous temperature field of all parts inside the food chamber, including the viewing window. This is to avoid condensation.

In alternative examples, the heater may not be present in the apparatus; cooking thus relying on the steam generated on the heated surface 16.

The heated surface 16 and the heater 18 may comprise respective heating elements: a first heating element for heating the heated surface and a second heating element for the heater. In alternative examples, both the heated surface and the heater may utilise a common heating element.

The apparatus shown in FIG. 1 is controlled by a controller 28, which controls the dosing system 22, and optionally the heating arrangement 16, 18. The controller 28 may thus be included in the control arrangement 22, 28 which controls the steam supply 16, 20, 23 to maintain a steam concentration in air inside the food chamber which is below saturation, as previously described. Alternative means of controlling the steam supply 16, 20, 23, e.g. using a control arrangement which does not require electronic control, such as a mechanically operated dosing system, may also be contemplated.

The controller receives temperature information from a temperature sensor 30. The temperature of interest is the temperature at the center of the food chamber, where the food is located. However, the temperature sensor, which may be a negative temperature coefficient (NTC) temperature sensor, may be located anywhere in the food chamber, with a known correlation between the temperature at the sensor location and the temperature in the middle of the chamber.

The temperature is regulated by switching on and off the heater 18 of the heating arrangement by the controller. The temperature of the heated surface, for steam generation, is regulated by a thermostat again by cycling on and off. These two control mechanisms may be independent.

The food chamber is vented to the ambient surroundings by vents 32. Thus, the food chamber remains at substantially atmospheric pressure during use.

The controller 28 controls the heating arrangement to heat water from the water reservoir to create steam using the heated surface 16, and to further heat the steam to create heated steam at a temperature in the range 100° C. to 120° C., preferably 110° C. to 120° C. The circulation system circulates the heated steam around the food chamber.

This cooker thus performs cooking using steam heated above 100° C. for example at 115° C. to 120° C., such as 120° C. The temperature is below an upper limit to prevent burning of the food, and so that the cooking process remains a water-based process which does not excessively dry out the food.

Figure 2:
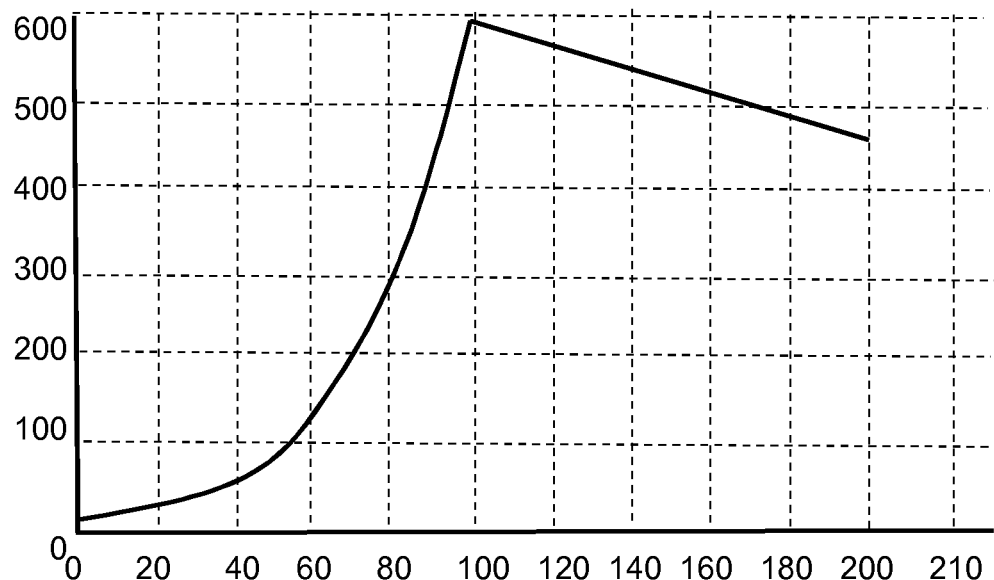
FIG. 2 shows the absolute humidity of steam at ambient pressure as a function of temperature.

This steam is relatively dry even when close to the maximal humidity level that is possible at elevated temperatures such as 120° C. This is explained with reference to FIG. 2 which shows the absolute humidity in $g/m^3$ (y-axis) of steam at ambient pressure as a function of temperature in ° C. (x-axis). There is a maximum humidity of around 570 $g/m^3$ at 100° C., after which there is a decrease. Thus, at elevated temperatures, the absolute humidity drops. At 120° C., the maximum is around 550 $g/m^3$. The heated steam preferably has an absolute humidity level greater than 450 $g/m^3$ since the water content remains the medium for transferring heat. The relative humidity has a maximum of around 50% at 120° C. and atmospheric pressure.

By combining a below-saturation steam concentration in air inside the food chamber with a temperature inside the food chamber which is greater than 100° C., water condensation inside the food chamber may be lessened or prevented. In combination with airflow, e.g. provided by the fan 24, and the vent or vents 32, the apparatus may work without any condensation of steam inside the food chamber.

The humidity level depends on the water delivery rate and the heating power. The vents of the food chamber maintain the pressure at ambient pressure. The vents may assist to avoid an overshoot of humidity and pressure in the food chamber.

The release mechanism provided by the vents means that the steam delivery rate does not need to be controlled, and instead there can be a preset water delivery rate to the heated surface 16. The controller may for example implement a control sequence which determines particular points of time when steam generation starts and/or ends.

When the apparatus is started from cold, the time at which steam generation starts is important to ensure condensation is avoided. Condensation will result if the transparent window is below the dew point, but the food will become dry if steam generation starts too late.

The water pump may also be switched off (so that steam generation is stopped) some time (such as one or a few minutes) before the end of the cooking time to avoid wet food results.

More generally, if the steam concentration in air inside the food chamber is above saturation, the steam supply may be controlled to cease, e.g. until the air inside the food chamber is no longer saturated with steam.

The heated steam is circulated rather than being provided as a continuous delivery of new steam. The condensing of steam on the food is still the main energy transfer parameter to heat up the food, but the amount of water on the food is far less than with standard steam cooking. Furthermore, the heat transfer density to food due to condensation and convection is increased compared to conventional steam cooking so that the time to cook the food is decreased. The result is shorter cooking times than a conventional steam cooker and also increased nutrient retention because the nutrients are not washed away by large amounts of water used in the cooking process. In particular, washing out of water-soluble vitamins is reduced.

The end result is improved taste and texture compared to a conventional steam cooking process.

The surfaces of the food chamber are above the dew point at the temperature, pressure and humidity level used, so that no condensation at a surface of the food chamber, such as the transparent viewing window 13, takes place. The viewing window has increased heat losses compared to an isolated wall so it is desirable for the window to be exposed to the flow created by the circulation system to maintain the viewing window above the dew point.

In addition to preventing the loss of soluble nutrients, it is desirable to provide fast deactivation of enzymes. This can be achieved by providing sufficient heating power and by controlling the heating arrangement such that an initial rise in the temperature of the whole food chamber to a temperature of 100° C. takes less than 2 minutes. This rapid initial heating preferably enables the food to reach 70° C. in less than 6 minutes.

The steam environment in the food chamber is a function of: air temperature, food mass, the amount of evaporated water, i.e. steam, and leakage. To keep the humidity below 100% RH, the water evaporation is controlled, as previously described.

In a non-limiting example, the steam concentration is maintained below 100% RH during the cooking process by using the following parameters: steam is supplied to the chamber at a rate of 10-16 g/min; the temperature in the food chamber is maintained higher than 100° C. preferably at 120° C.; the food mass is 0.1-1 kg; the vent is defined by an exhaust opening which is 2-5 mm across; the minimum airflow in the food chamber is about 2 l/min. In this example, the dimensions of the food chamber are: length 30 cm×height 18 cm×width 20 cm. The water content of food to be steamed may be between 50% and 95% by weight, such as between 80% and 95%, e.g. 79% for potatoes, 90% for broccoli, 85% for carrots, 70-80% for fish and 60-70% chicken.

Figure 3:
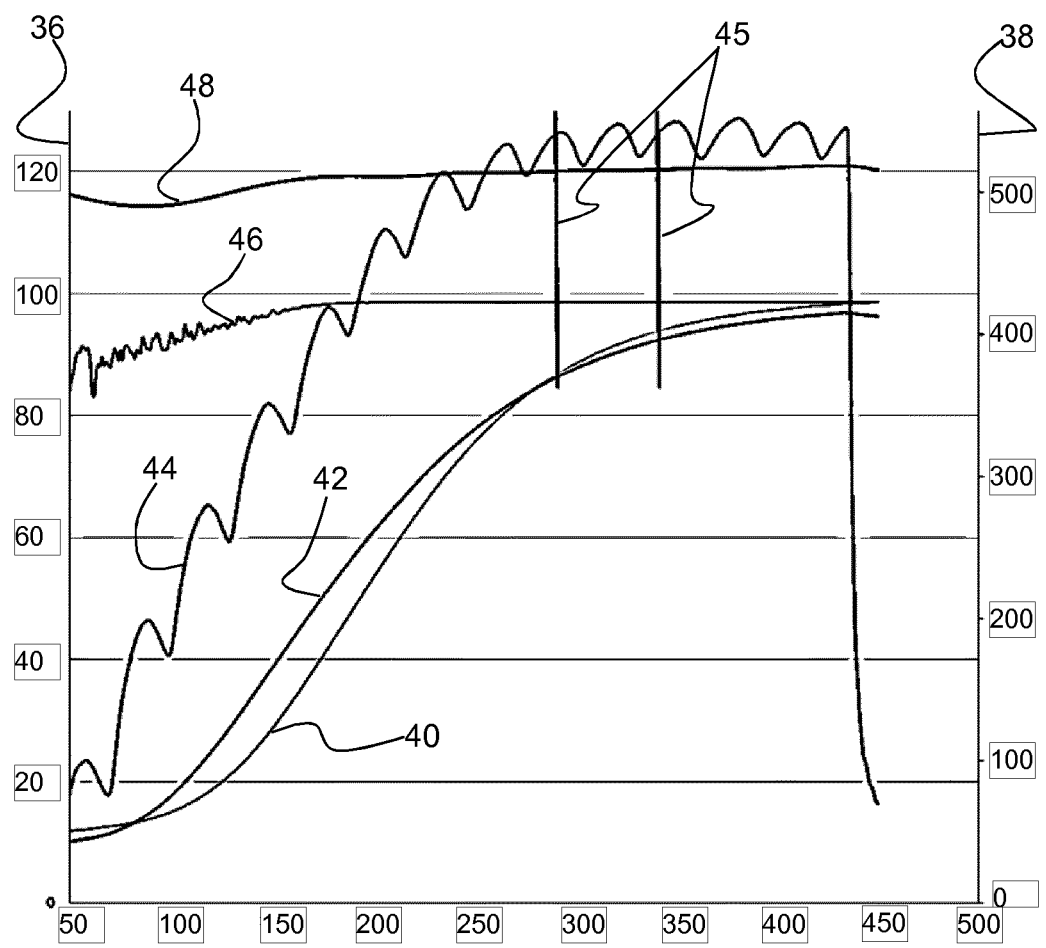
FIG. 3 shows temperature and absolute humidity plots relating to respective cooking processes using an apparatus according to a present example embodiment and using a conventional steamer.

FIG. 3 shows temperature and absolute humidity plots relating to respective cooking processes using an apparatus according to a present example embodiment and using a conventional steamer (a Philips HD9190). In this example, broccoli samples are heated up in the respective steamers. The temperature in ° C. (axis 36) and the absolute humidity in $g/m^3$ (axis 38) are plotted as a function of the cooking time in seconds (x-axis).

At the start of the cooking process, the cool (<20° C.) or frozen food is put into the food chamber. Plot 44 shows the absolute humidity in the food chamber as a function of the cooking time for the apparatus according to the present example embodiment. Initially, as the steam concentration in the cooking device is less than 100% RH, all of the steam introduced into the chamber immediately condenses on the broccoli, which leads to a humidity drop in the food chamber (e.g. to <20% RH or <200 $g/m^3$ at the start phase of cooking). Only part of this initial period is shown in FIG. 3, which shows the cooking process from 50 seconds onwards. Less water condenses on the broccoli as the cooking process proceeds, i.e. as the broccoli heats up. The lines 45 represent an optimal doneness of the broccoli. This doneness may be estimated using a humidity sensor in the food chamber, as previously described. To the right of the region delimited by the lines 45, the food may be overcooked, and to the left of this region, the food may be undercooked, i.e. since the core temperature of the food may be too low to attain sufficient doneness.

Note that, for the present apparatus, if there is no food inside the chamber the humidity may increase up to ~560 $g/m^3$ AH. In such a scenario, there may still be no condensation of steam: the unused steam may leave the food chamber via a vent, as previously described.

The rate at which the food heats up may at least partly depend of the amount of steam condensing on the food (broccoli in this case). A lack of steam may result, in extreme cases, in a longer time for the food to heat up. However, steam saturation may not be required to achieve the desired relatively short cooking times. Plot 40 shows the broccoli core temperature as a function of the cooking time in the conventional steamer under steam saturation conditions, and plot 42 shows the core temperature of the broccoli in the apparatus according to the present example embodiment, i.e. under below-saturation conditions. It is evident from plots 40 and 42 of FIG. 3, that the time it takes to heat up the broccoli in the apparatus according to the present example embodiment is very similar to that for the conventional steamer. This demonstrates that comparable steam cooking times may be attained without using a saturated steam environment.

Plot 46 shows the temperature of the food chamber of the conventional apparatus, while plot 48 shows the temperature of the food chamber of the apparatus according to the present example embodiment. The latter is consistently higher than the former, which assists to compensate for the lower steam concentration in the apparatus according to the present example embodiment, as previously described.

Figure 4:
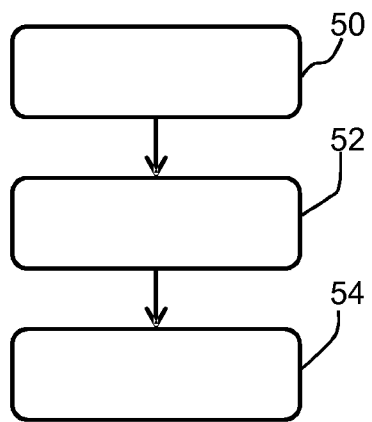
FIG. 4 shows a flowchart of a cooking method.

FIG. 4 shows a cooking method, comprising:
in step 50, receiving food to be cooked in a food chamber;
in step 52, supplying steam to the food chamber receiving (50) food to be cooked in a food chamber; and
in step 54 controlling the supply of steam such that a steam concentration in air inside the food chamber is maintained below saturation.

As discussed above, embodiments make use of a controller. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A cooking apparatus, comprising:
    a food chamber;
    a steam supply for supplying steam to the food chamber, the steam supply comprising:
        a heated surface for evaporating water, the heated surface comprising a first heating element; and
        a water supply arranged to dispense water onto the heated surface; and
    a control arrangement adapted to control the heated surface and the water supply to maintain a steam concentration in air inside the food chamber which is below saturation throughout a cooking process such that a diminishing degree of condensation, on food as the cooking process proceeds, coincides with an increasing steam concentration in air inside the food chamber,
    wherein the cooking apparatus further comprises a heater comprising a second heating element within the food chamber arranged to heat the steam in the food chamber by convection.

2. The cooking apparatus of claim 1, wherein the control arrangement is adapted to control the water supply to dispense water at a predetermined rate and wherein the control arrangement is further adapted to estimate a doneness level of the food during the cooking process by monitoring the steam concentration.

3. The cooking apparatus of claim 1, wherein the water supply comprises:
    a reservoir for the water; and
    a pump for transporting the water from the reservoir to the heated surface, wherein the pump is controlled by the control arrangement.

4. The cooking apparatus of claim 1, wherein the control arrangement is further adapted to control the heater to heat the food chamber to a predetermined temperature.

5. The cooking apparatus of claim 1, wherein the heater is adapted to heat the food chamber to at least 100° C.

6. The cooking apparatus of claim 1, further comprising a fan arranged to circulate gases in the food chamber.

7. The cooking apparatus of claim 1, further comprising a moisture sensor for detecting said steam concentration in the food chamber.

8. The cooking apparatus of claim 7, wherein the control arrangement is adapted to control the steam supply according to the steam concentration detected by said moisture sensor, and wherein the control arrangement is further adapted to control the heater according to the steam concentration detected by said moisture sensor.

9. The cooking apparatus of claim 7, wherein the control arrangement is adapted to cease or restrict supply of the steam when the steam concentration reaches a threshold concentration, and wherein the control arrangement is further adapted to control the heater to reduce or stop heating of the food chamber when said threshold concentration is reached.

10. The cooking apparatus of claim 1, wherein the food chamber comprises a vent for steam to escape from the food chamber, wherein the vent is defined by an opening having a diameter of 2 mm to 5 mm.

11. The cooking apparatus of claim 1, wherein the transparent viewing window is included in an openable lid of the food chamber.

12. A method of cooking, comprising:
    receiving food to be cooked in a food chamber with a transparent viewing window;
    supplying steam to the food chamber;
    controlling the supply of steam such that a steam concentration in air inside the food chamber is maintained below saturation throughout a cooking process such that a diminishing degree of condensation on food as the cooking process proceeds coincides with an increasing steam concentration in air inside the food chamber, wherein the steam supply comprises a heated surface for evaporating water, the heated surface comprising a first heating element, and a water supply arranged to dispense water onto the heated surface, and wherein the controlling comprises controlling the dispensing of the water onto the heated surface;
    heating the steam in the food chamber via a second heating element within the food chamber by convection.

13. The method of claim 12, further comprising estimating a doneness level of the food during the cooking process by monitoring the steam concentration.

* * * * *